(12) United States Patent
Liu et al.

(10) Patent No.: US 11,175,993 B2
(45) Date of Patent: Nov. 16, 2021

(54) MANAGING DATA STORAGE SYSTEM

(71) Applicant: International Business Machines Corporation, Armonk, NY (US)

(72) Inventors: Liang Liu, Beijing (CN); Junmei Qu, Beijing (CN); Wen Jun Yin, Beijing (CN); Wei Zhuang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 14/738,783

(22) Filed: Jun. 12, 2015

(65) Prior Publication Data

US 2015/0378835 A1    Dec. 31, 2015

(30) Foreign Application Priority Data

Jun. 30, 2014  (CN) .......................... 201410305761.8

(51) Int. Cl.
| | | |
|---|---|---|
| *G06F 15/16* | (2006.01) | |
| *G06F 11/14* | (2006.01) | |
| *G06F 16/16* | (2019.01) | |
| *G06F 16/13* | (2019.01) | |
| *G06F 11/20* | (2006.01) | |

(52) U.S. Cl.
CPC .......... *G06F 11/1448* (2013.01); *G06F 16/13* (2019.01); *G06F 16/164* (2019.01); *G06F 11/1402* (2013.01); *G06F 11/1469* (2013.01); *G06F 11/2094* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 7,472,242 B1 | 12/2008 | Deshmukh et al. | |
| 7,660,822 B1 * | 2/2010 | Pfleger | G06F 17/30554 707/693 |
| 8,621,166 B1 | 12/2013 | Chatterjee et al. | |
| 8,650,162 B1 | 2/2014 | Vaikar et al. | |
| 2006/0048002 A1 * | 3/2006 | Kodi | G06F 11/1448 714/13 |
| 2006/0106766 A1 * | 5/2006 | Bloom | G06F 17/30463 |
| 2006/0224554 A1 * | 10/2006 | Bailey | G06F 17/30864 |
| 2007/0143246 A1 * | 6/2007 | Bestgen | G06F 17/30306 |

(Continued)

FOREIGN PATENT DOCUMENTS

CN            101176058 A         5/2008

OTHER PUBLICATIONS

Chang et al., "Dynamic Deduplication Decision in a Hadoop Distributed File System," International Journal of Distributed Sensor Networks, vol. 2014, Apr. 28, 2014, pp. 1-14.

(Continued)

*Primary Examiner* — Alex Gofman
(74) *Attorney, Agent, or Firm* — Zilka-Kotab, P.C.

(57) ABSTRACT

In one embodiment, a method for managing a data storage system includes: in response to receiving a data object, sorting data records in the data object on the basis of a first query so as to form a first backup; causing the first backup to be stored in the data storage system; and cause to be stored, in an index of the data storage system, the first query and a first address of the first backup in the data storage system.

13 Claims, 8 Drawing Sheets

600

| 630 Mapping Relationship |
|---|
| A11---B12 |
| A12---B13 |
| A13---B21 |
| A21---B22 |
| A22---B23 |
| A23---B11 |

(56) References Cited

U.S. PATENT DOCUMENTS

| | | | |
|---|---|---|---|
| 2008/0177961 A1* | 7/2008 | McSharry | G06F 11/1451 |
| | | | 711/162 |
| 2010/0306177 A1* | 12/2010 | Khosravi | G06F 11/1464 |
| | | | 707/674 |
| 2012/0054280 A1* | 3/2012 | Shah | G06F 9/5072 |
| | | | 709/205 |
| 2012/0323923 A1* | 12/2012 | Duan | G06F 16/24554 |
| | | | 707/741 |
| 2013/0018890 A1* | 1/2013 | Rajan | G06F 17/30336 |
| | | | 707/741 |
| 2013/0124493 A1* | 5/2013 | Lang | G06F 17/30861 |
| | | | 707/706 |
| 2013/0282650 A1 | 10/2013 | Zhang et al. | |
| 2013/0282976 A1* | 10/2013 | Dubnicki | G06F 12/00 |
| | | | 711/112 |
| 2013/0325812 A1 | 12/2013 | Carter | |
| 2014/0081927 A1 | 3/2014 | Lipcon et al. | |

OTHER PUBLICATIONS

Kim et al., "Efficient Range-based Query Processing on the Hadoop Distributed File System," Advanced Science and Technology Letters, vol. 43, Multimedia 2013, Dec. 2013, pp. 110-113.

Sheu et al. "Design and Implementation of File Deduplication Framework on HDFS," International Journal of Distributed Sensor Networks, vol. 2014, Apr. 10, 2014, pp. 1-11.

Office Action from Chinese Patent Application No. 201410305761.8, dated Mar. 30, 2018.

\* cited by examiner

MANAGING DATA STORAGE SYSTEM

RELATED APPLICATIONS

The present application claims priority to Chinese Patent Application No. 201410305761.8, filed Jun. 30, 2014 and entitled "Managing Data Storage System," the contents of which are herein incorporated by reference.

BACKGROUND

Various embodiments of the presently disclosed inventive concepts relate to data storage, and more specifically, to a method and apparatus for managing a data storage system.

With the development of data storage technology, significant improvements have been made to data storage systems in respects of storage space, reliability and response efficiency. Coupled with technical improvements, people's requirements on storage systems also get increasingly high. For example, there is a growing variety of data types involved in people's daily life and work. On the one hand, people desire to store these data into a mass database, and on the other hand, people's requirements on the accuracy and real time of data query rise gradually.

Take the power industry for example only, people are no longer satisfied with querying monthly total power consumption but wish to query various data in real time, such as current power consumption, a current value, a voltage value, a resistance value and other information. Power companies usually store types of data using multi-dimensional databases. For example, the database of a power company might involve following dimensions: smart meter ID, time point, current, voltage, resistance, etc. (here, all the current, voltage and resistance are values collected at a certain time point). With the increase of dimension of the multi-dimensional database, queries about the multi-dimensional database might involve various respects of contents. For example, it is possible to query data collected from various smart meters in a certain time range, query data collected by a specific smart meter in all time ranges, etc.

Note with the increase of database dimensions and the data amount, the query efficiency will be affected by a storage mode of data records in the database. However, under current data storage modes, the query efficiency is rather unsatisfactory. In particular, when it is necessary to query a data record meeting query conditions across a plurality of data records in the database, the query efficiency is far from satisfactory.

For example, suppose a database stores data that is collected by 100 smart meters at 10,000 time points, and the database stores in order data collected by a smart meter 1 at time points t1-t10000, data collected by a smart meter 2 at time points t1-t10000, . . . , data collected by a smart meter 100 at time points t1-t10000. When there is a need to query data collected by each smart meter at time point t1, then data records at the $1^{st}$ line, the $10001^{st}$ line, the $20001^{st}$ line, . . . need to be read in order. Since it is necessary to read data across a large interval within the database, the query efficiency is low.

Therefore, how to increase the query efficiency of a data storage system becomes a burning issue.

BRIEF SUMMARY

In one embodiment of the presently disclosed inventive concepts, there is provided a method for managing a data storage system. The method includes, in response to receiving a data object, sorting data records in the data object on the basis of a first query so as to form a first backup; causing the first backup to be stored in the data storage system; and causing to be stored, in an index of the data storage system, the first query and a first address of the first backup in the data storage system.

In one embodiment of the presently disclosed inventive concepts, there is provided a computer program product for querying a data storage system, the computer program product comprising a computer readable storage medium having program instructions embodied therewith, the program instructions readable by a processor to cause the processor to perform a that includes receiving a query with respect to a data storage system; and in response to there existing, in an index of the data storage system, a query matching the query, accessing an address associated with the matching query in the data storage system so as to execute the query; wherein the data storage system is a data storage system managed by a method according to the presently disclosed inventive concepts.

In one embodiment of the presently disclosed inventive concepts, there is provided an apparatus for managing a data storage system, comprising: a sorting module configured to, in response to receiving a data object, sort data records in the data object on the basis of a first query so as to form a first backup; a storing module configured to store the first backup in the data storage system; and an indexing module configured to store, in an index of the data storage system, the first query and a first address of the first backup in the data storage system.

In one embodiment of the presently disclosed inventive concepts, there is provided an apparatus for querying a data storage system, comprising: a receiving module configured to receive a query with respect to the data storage system; and a first querying module configured to, in response to there existing, in an index of the data storage system, a query matching the query, access an address associated with the matching query in the data storage system so as to execute the query; wherein the data storage system is a data storage system managed by an apparatus according to the presently disclosed inventive concepts.

By means of the methods and apparatuses described in the presently disclosed inventive concepts, data storage systems can be managed effectively, and query efficiency in data storage systems can be improved.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

It is desired to develop a technical solution capable of effectively managing a data storage system, it is desired the technical solution can improve the query efficiency in the data storage system, and it is desired the query efficiency of the technical solution still can be effective when the database stores multi-dimensional data and/or mass data. Further, it is desired the technical solution can be integrated with an existing data storage system (such as a centralized data storage system and/or distributed data storage system) and improve the query efficiency while not changing existing hardware resource configuration as far as possible.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
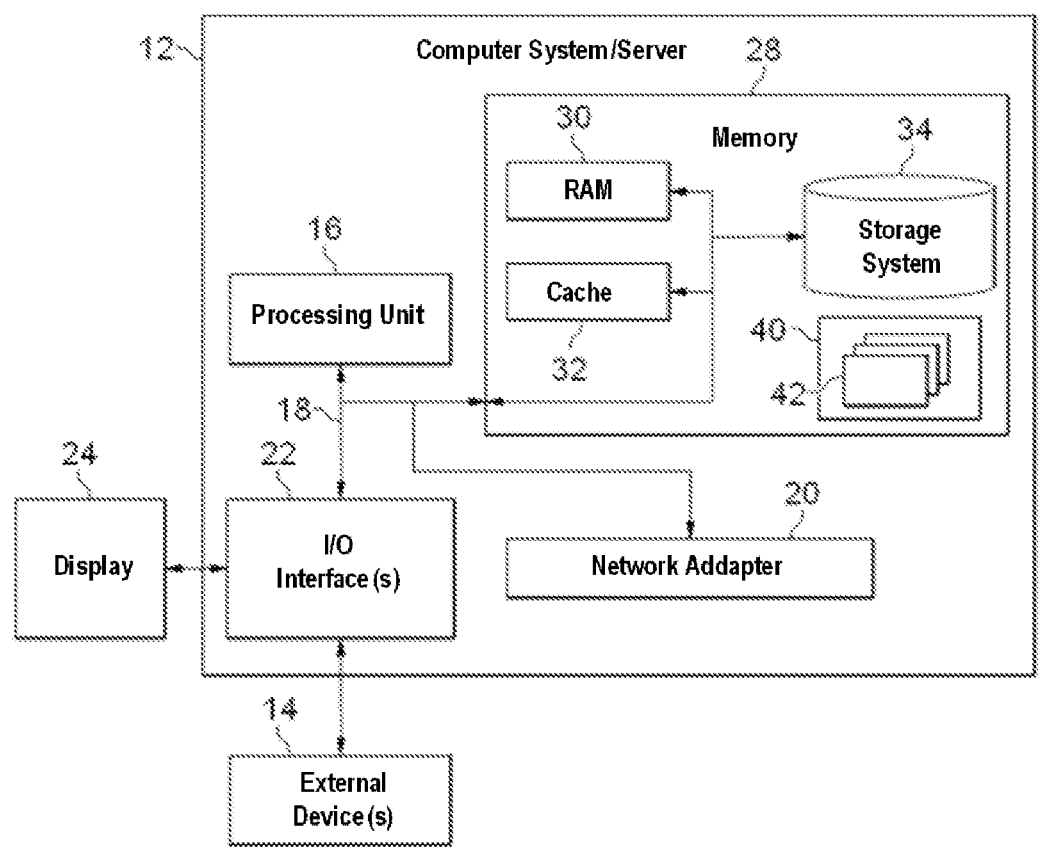
FIG. 1 schematically shows an exemplary computer system/server 12 which is applicable to implement the embodiments of the presently disclosed inventive concepts.

Referring now to FIG. 1, in which an exemplary computer system/server 12 which is applicable to implement the embodiments of the presently disclosed inventive concepts is shown. Computer system/server 12 is only illustrative and is not intended to suggest any limitation as to the scope of use or functionality of embodiments of the presently disclosed inventive concepts described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the presently disclosed inventive concepts as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

For the sake of clarity, various embodiments of the presently disclosed inventive concepts will be described by means of a concrete example of a database table in the context of the presently disclosed inventive concepts. For example, a power company's table "Record" used for recording data that is collected from smart meters 1-n at different time points may be shown as Table 1 below.

TABLE 1

Example of Data Object

| Timestamp | Meter_id | Current | Voltage | Resistance |
|---|---|---|---|---|
| 2010-12-01 01:00:00.0000 | 1 | 4.0 | 160 | 40 |
| 2010-12-01 01:00:00.0000 | 2 | 5.0 | 175 | 44 |
| ... | ... | ... | ... | ... |
| 2010-12-01 01:00:10.0000 | 1 | 4.5 | 155 | 35 |
| 2010-12-01 01:00:10.0000 | 2 | 4.5 | 160 | 35 |
| ... | ... | ... | ... | ... |
| 2010-12-01 01:00:20.0000 | 1 | 5.0 | 165 | 33 |
| ... | ... | ... | ... | ... |

In the data object shown in Table 1 above, various data records are sorted by timestamp, i.e., first n lines of data records collected by meters 1-n at a time point "2010-12-01 01:00:00.0000" are stored, then n lines of data records collected by meters 1-n at a time point "2010-12-01 01:00: 10.0000" are stored, and so on and so forth. Note although various embodiments of the presently disclosed inventive concepts are described by means of time series data in this specification, those skilled in the art should understand the embodiments of the presently disclosed inventive concepts are not limited to the time series data application but may be applied to all types of relational databases.

Nowadays database dimensions become increasingly high and the data amount gets growingly large. In order to provide more reliable data storage, there have been proposed technical solutions for distributed data storage. In a distributed data storage system, multiple backs of a data object may be stored in multiple data nodes, so that when parts of data nodes fail, backups in failing nodes may be recovered using data in other non-failing data nodes.

Figure 2:
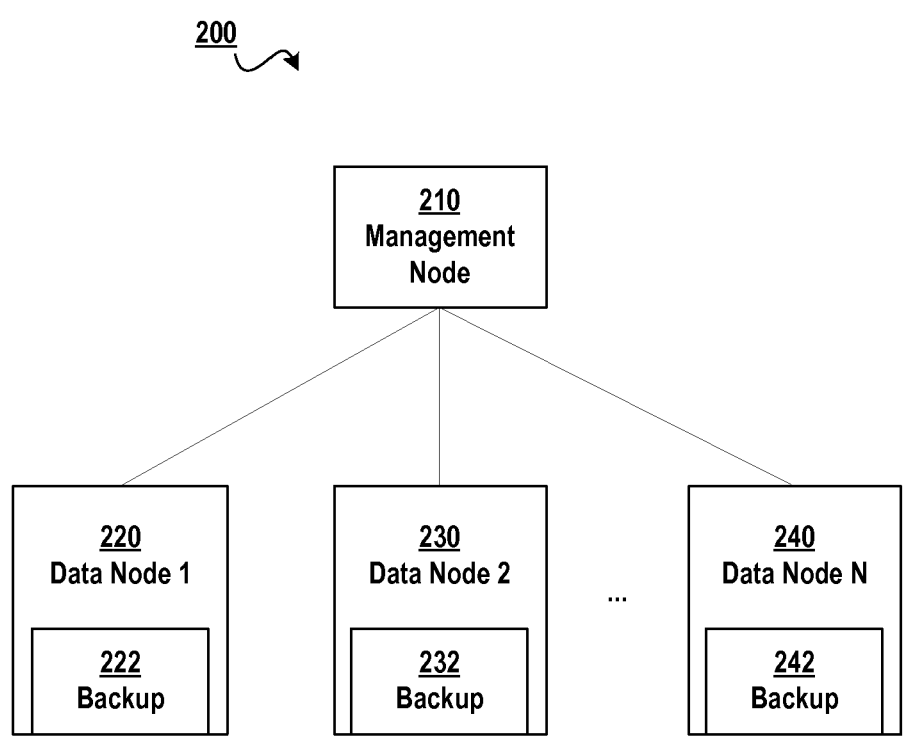
FIG. 2 schematically shows a block diagram of a technical solution for managing a data storage system according to one technical solution.

FIG. 2 schematically shows a block diagram 200 of a technical solution for managing a data storage system according to one technical solution. As shown in FIG. 2, the data storage system may comprise a management node 210 for managing a plurality of data nodes (i.e., a data node 1 220, a data node 2 230, . . . , and a data node N 240). To provide higher reliability, each data node may include a backup of a data object, for example, data node 1 220 includes a backup 222, data node 2 230 includes a back 232, and data node N 240 includes a backup 242. Note the "backup" here refers to a complete copy of the data object. These backups, though denoted by different reference numerals in FIG. 2, have completely same content.

Now it is found that with respect to the same query statement, when the arrangement order of data records in a data object varies, the query efficiency also differs somewhat. In view of this phenomenon, the presently disclosed inventive concepts propose a technical solution for managing a data storage system. Specifically, an order of data records in a backup may be adjusted on the basis of historical queries on the data object, and subsequently a query may be implemented with respect to the adjusted backup, so as to increase the query efficiency. Further, a plurality of backups may be generated on the basis of a plurality of historical queries, and the plurality of backups are stored to a plurality of data nodes.

Figure 3:
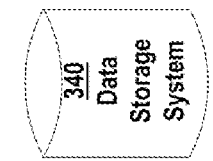
FIG. 3 schematically shows a block diagram of a technical solution for managing a data storage system according to one embodiment of the presently disclosed inventive concepts.

FIG. 3 schematically shows a block diagram 300 of a technical solution for managing a data storage system according to one embodiment of the presently disclosed inventive concepts. As shown in this figure, a data object 310 represents an original data object; as shown in Table 1, various data records are arranged by timestamp at this point. For example, there is a query statement 320 "SELECT * FROM RECORD WHERE METER_ID=XXX," this statement representing all data collected by a specific smart meter "XXX" at various time points needs to be looked up in the data table RECORD. Suppose there exist 10000 different time points; according to an existing order of data records in data object 310, records meeting the query condition need to be obtained across huge numbers of data records (i.e., data records at the $1^{st}$ line, the $10001^{st}$ line and the $20001^{st}$ line need to be read in order), so the query efficiency is quite low.

According to various embodiments of the presently disclosed inventive concepts, data records in data object 310 may be re-sorted (as shown by arrow A) on the basis of query statement 320 so as to form a backup 330, and backup 30 may be stored to a data storage system 340 (as shown by arrow B). In backup 330, data records are re-sorted by meter ID, at which point data records that used to be stored at the $1^{st}$ line, the $10001^{st}$ line and the $20001^{st}$ line in data object 310 are stored consecutively (e.g., stored in consecutive data blocks). In this manner, it is no longer necessary to read data across mass data records, but only a segment of consecutive data needs to be read from the backup. Although it takes some period of time to transform data object 310 into backup 330, the transformation is completed in advance of a query, so this pre-processing step will not prejudice the query efficiency. In addition, when there exist a large amount of queries like "SELECT * FROM RECORD WHERE METER_ID=XXX," the technical solution of the present can greatly improve the query efficiency.

In one embodiment of the presently disclosed inventive concepts, there is proposed a method for managing a data storage system, comprising: in response to receiving a data object, sorting data records in the data object on the basis of a first query so as to form a first backup; storing the first backup in the data storage system; and storing, in an index of the data storage system, the first query and a first address of the first backup in the data storage system.

Figure 4:
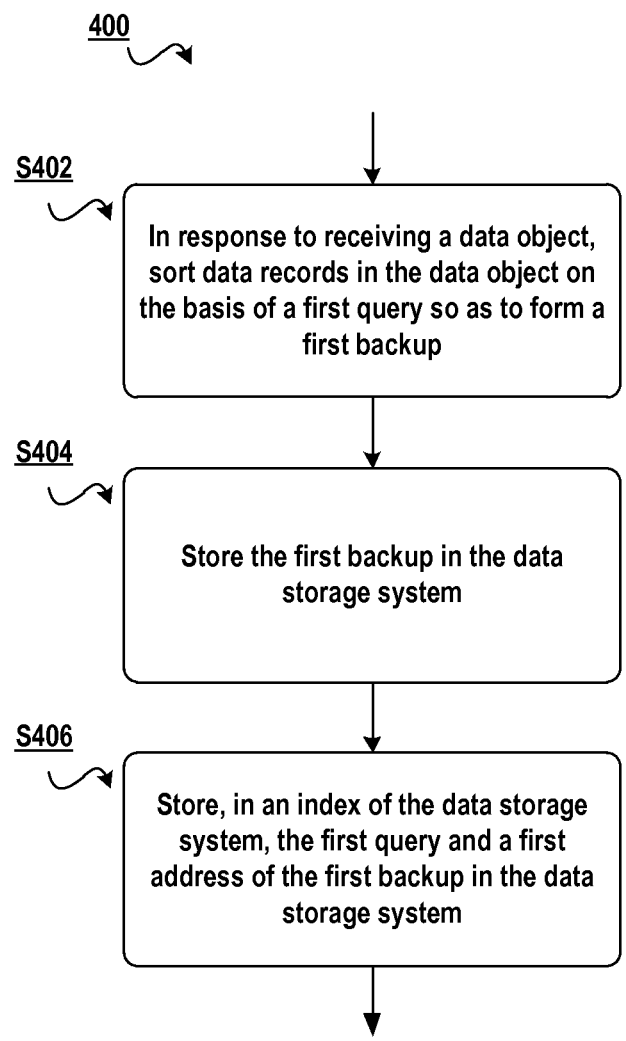
FIG. 4 schematically shows a block diagram of a method for managing a data storage system according to one embodiment of the presently disclosed inventive concepts.

With reference to the accompanying drawings, detailed description is presented below to various embodiments of the presently disclosed inventive concepts. FIG. 4 schematically shows a flowchart 400 of a method for managing a data storage system according to one embodiment of the presently disclosed inventive concepts. In step S402, in response to receiving a data object, data records in the data object are sorted on the basis of a first query so as to form a first backup. In one embodiment of the presently disclosed inventive concepts, for example, the first query may be determined on the basis of a main function of the data storage system, or the first query may be determined on the basis of an occurrence frequency of each query statement among historical queries.

For example, when the data storage system can only query data associated with a specific smart meter, various data records can be sorted in a format shown by reference numeral 330 in FIG. 3. For another example, when historical queries on the data storage system show that 80% of historical queries query data of various meters collected at a specific time point, data records may be sorted in a format shown by reference numeral 310 in FIG. 3. By sorting various data records in the data object on the basis of a query with the highest possibility of occurrence and generating a backup, a satisfactory query efficiency can be obtained when executing a query on the backup.

Next, in step S404 the first backup is stored in the data storage system. Since the data storage system may have mass data storage, to conveniently access the first back in subsequent write and read operations, in step S406 the first query and a first address of the first backup in the data storage system are stored in an index of the data storage system.

In one embodiment of the presently disclosed inventive concepts, there is further comprised: maintaining a backup of the data object in the data storage system. In this embodiment, the data object's backup and the first backup may be maintained in the data storage system; since an arrangement order of data records in the first backup is set with respect to the first query, the first backup can increase both the data reliability but also the query efficiency.

In one embodiment of the presently disclosed inventive concepts, the sorting, in response to receiving a data object, data records in the data object on the basis of a first query so as to form a first backup comprises: obtaining a first standard on the basis of the first query; and sorting data records in the data object according to the first standard so as to form the first backup.

In the embodiments of the presently disclosed inventive concepts, the first standard may be obtained on the basis of the first query. For example, the query statement "SELECT * FROM RECORD WHERE METER_ID=XXX" serves a purpose to query all data collected from a specific meter "XXX." At this point, when various data records in the data object are sorted to form a backup according to a standard "METER_ID" specified in the query statement, a higher query efficiency may be achieved. For another example, a query statement "SELECT * FROM RECORD WHERE TIMESTAMP=XXX" serves a purpose to query all data collected at a specific time point "XXX." At this point, when various data records in the data object are sorted to form a backup according to a standard "TIMESTAMP" specified in the query statement, a higher query efficiency may be achieved.

In one embodiment of the presently disclosed inventive concepts, the first standard makes it possible that the query efficiency of executing the first query in the first backup is higher than the query efficiency of executing the first query in other file formed by sorting data records in the data object according to other standard.

Note since the first backup is formed by sorting according to the first query, the efficiency of executing the first query with respect to the first backup is the highest. In other words, by sorting using the first standard, the query efficiency of executing the first query in the first backup is made higher than the query efficiency of executing the first query in other file formed by sorting data records in the data object according to other standard.

Specifically, regarding the above example, when the first query is "SELECT * FROM RECORD WHERE METER_ID=XXX," the first backup is as shown by backup 330 in FIG. 3, at which point the query efficiency with respect to the first backup is much higher than the query efficiency with respect to data object 310 as shown in FIG. 3. This is because when executing a query with respect to data object 310, various data records need to be read in a skip fashion, so the efficiency is quite low.

In one embodiment of the presently disclosed inventive concepts, the data object is a multi-dimensional database, and the obtaining a first standard on the basis of the first query comprises: obtaining the first standard on the basis of at least one dimension in the multi-dimensional database corresponding to the first query. When executing a query with respect to a multi-dimensional database, a plurality of dimensions might be involved. For example, data collected by the 1-u meter in each week may be queried, at which point data collected by the 1-u meter in each week may be arranged together so as to obtain a higher query efficiency. According to a function of the data storage system, the data records may be sorted according to a plurality of dimensions involved in the query.

In one embodiment of the presently disclosed inventive concepts, the sorting, in response to receiving a data object, data records in the data object on the basis of a first query so as to form a first backup comprises: according to block size supported by the data storage system, dividing the sorted data records into a plurality of data blocks; and forming the first backup on the basis of the plurality of data blocks.

In the storage system data is stored in the data block as a unit, so the sorted data records may be organized on the basis of data blocks. Suppose the size of a data block in the data storage system is 64 M, and the total capacity of data records associated with each meter ID in backup 330 shown in FIG. 3 is 64 M, then all data associated with one meter ID may be stored in each data block. Suppose there is a total of 10 meters, then 10 data blocks jointly form the first backup.

Although illustrated above is a circumstance where the total capacity of data records associated with each meter is just 64 M, those skilled in the art may understand the embodiments of the presently disclosed inventive concepts may also be adopted when the total capacity is less or more than 64 M. For example, suppose the total capacity of data records associated with each meter is 60 M, data associated with one meter may be stored using one data block. Specifically, the remaining 4 M space may be left free or used to store data of a next meter. For another example, suppose the total capacity of data records associated with each meter is 100 M, then data associated with one meter may be stored in two or more data blocks.

In one embodiment of the presently disclosed inventive concepts, an address of each data block may be stored in the index, so that a data block meeting the query condition can be located rapidly in response to receiving a query. This may be implemented by those skilled in the art on the basis of requirements of a concrete application environment.

In one embodiment of the presently disclosed inventive concepts, there is further comprised: sorting the data records in the data object on the basis of a second query so as to form a second backup; storing the second backup in the data storage system; and storing, in the index of the data storage system, the second query and a second address of the second backup in the data storage system.

To further increase the data query efficiency, a plurality of backups of the data object may be stored in the data storage system, and each among the plurality of backups is formed after sorting the data records in the data object according to one query. When executing a query, a backup corresponding to the query statement may be queried and further the query efficiency enhanced.

Figure 5:
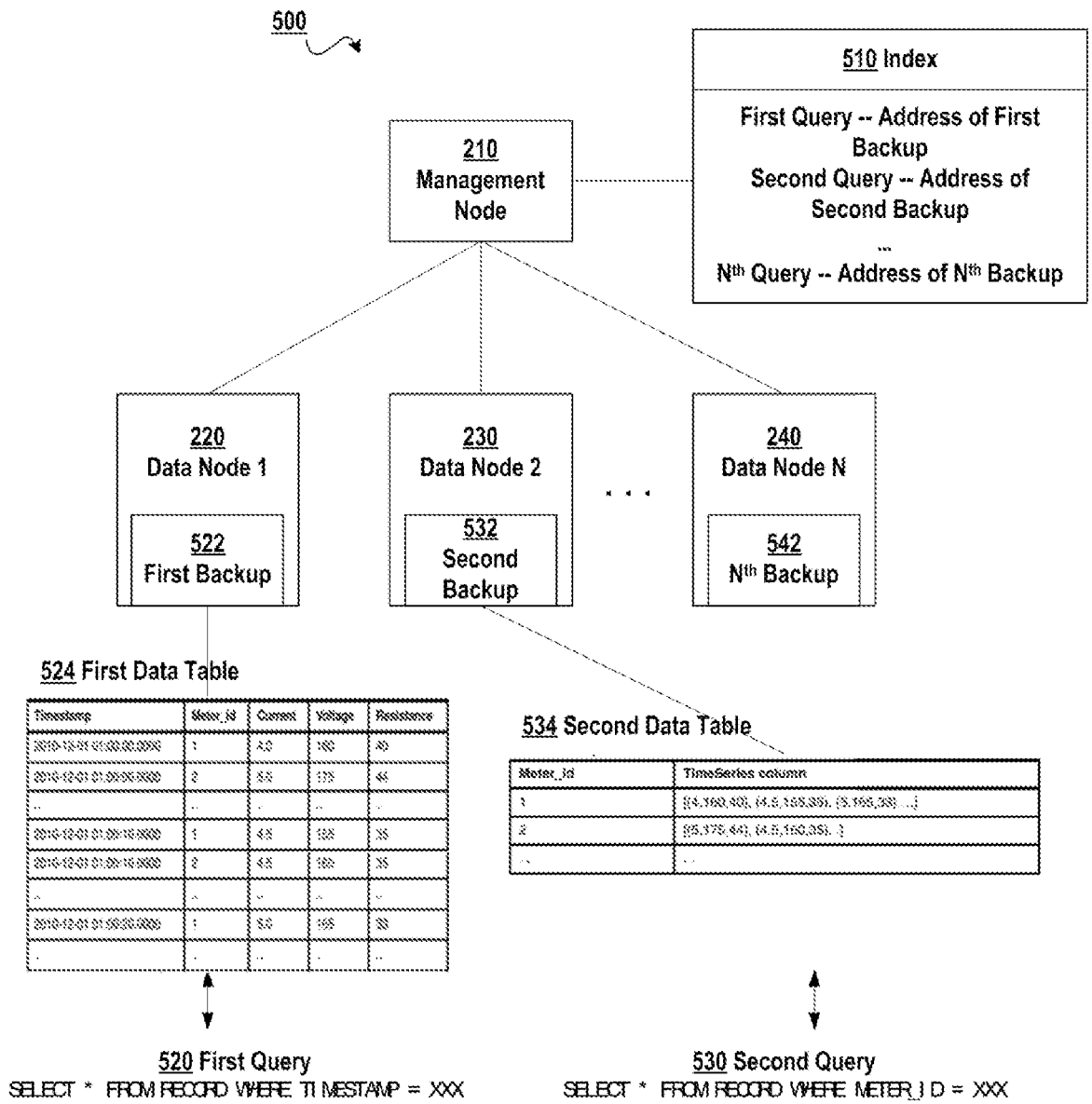
FIG. 5 schematically shows a block diagram of a technical solution for managing a data storage system according to one embodiment of the presently disclosed inventive concepts.

FIG. 5 schematically shows a block diagram 500 of a technical solution for managing a data storage system according to one embodiment of the presently disclosed inventive concepts. In the data storage system, management node 210 can manage various data nodes, such as data node 1 220, data node 2 230, . . . , data node N 240, and further an index 510 recording a mapping relationship between various queries and corresponding backups may be maintained. Unlike the technical solution as shown in FIG. 2, in the embodiment shown in FIG. 5, backups (i.e., a first backup 522, a second backup 532, an $N^{th}$ file 542) stored in various data nodes do not coincide but are formed after sorting data records in the data object on the basis of different queries.

As shown in FIG. 5, first backup 522 may be stored in a format of a first data table 524, and first backup 522 corresponds to a first query 520. Second backup 532 may be stored in a second format of a second data table 534, and second backup 532 corresponds to a second query 530. In this manner, when a different query is received, it is guided to a corresponding backup, so as to increase the query efficiency. Compared with technical solutions for storing the same backup in various data nodes in the prior art, by means of the technical solution of the presently disclosed inventive concepts, the data query efficiency can be enhanced while increasing the data reliability.

It should be appreciated that although various embodiments of the presently disclosed inventive concepts are described with reference to an application environment of the distributed data storage system in FIG. 5, those skilled in the art should understand that the embodiments of the presently disclosed inventive concepts are not limited to a distributed data storage environment application but may be applied to other data storage environment. For example, a plurality of backups generated on the basis of a plurality of queries may be stored in one data server; although the plurality of backups will occupy an additional storage space, the query efficiency can be enhanced significantly by guiding different queries to different backups. For another example, the presently disclosed inventive concepts may further run in a virtual machine environment. For example, management node 210 and various data nodes 220-240 as shown in FIG. 5 may be virtual machines.

Illustration has been presented above to storing multiple backups corresponding to multiple queries in multiple data nodes. Although data records in the multiple backups are the same, arrangement orders of data records are different. Therefore, when the backup in one data node is corrupted or updated, an additional processing procedure may be needed.

In one embodiment of the presently disclosed inventive concepts, there is further comprised: obtaining a mapping relationship between data records in the first backup and data records in the second backup; and in response to the first backup being corrupted, recovering the first backup from the second backup on the basis of the mapping relationship. In one embodiment of the presently disclosed inventive concepts, contents in the first backup and the second backup are same as a whole; the difference is that data records are sorted differently, so data blocks in the first backup and the second backup have a mapping relationship. For example, a data block A in the first backup may correspond to a data block B in the second backup. At this point, when data block A in the first backup is corrupted, it may be recovered using data block B in the second backup.

In one embodiment of the presently disclosed inventive concepts, the recovering, in response to the first backup being corrupted, the first backup from the second backup on the basis of the mapping relationship comprises: looking up in the second backup a second backup block corresponding to a corrupted first backup block in the first backup on the basis of the mapping relationship; and copying the second backup block to replace the corrupted first backup block.

Figure 6:
FIG. 6 shows a schematic view of recovering a backup in a data storage system according to one embodiment of the presently disclosed inventive concepts.

With reference to FIG. 6 below, detailed description is presented to concrete details of the recovery step. FIG. 6 shows a schematic view 600 for recovering a file in the data storage system according to one embodiment of the presently disclosed inventive concepts. As shown in this figure, a first backup 610 comprises a plurality of data blocks A11-A23, and a second backup 620 comprises a plurality of data blocks B11-B23, and a mapping relationship between data blocks in the first backup and data blocks in the second backup is as shown by Table 630. When a data block A22 (shown in shadow) in the first backup is corrupted, as seen from mapping relationship 630, data block A22 in first backup 610 corresponds to a second data block B23 in second backup 620. Therefore, data block B23 is copied directly to cover corrupted data block A22.

Detailed illustration has been presented above to concrete steps of the recovery operation with reference to the figure. Hereinafter, description is presented to how to update other backup when one backup in the data storage system is updated. In one embodiment of the presently disclosed inventive concepts, there is further comprised: obtaining a mapping relationship between data blocks in the first backup and data blocks in the second backup; and in response to the second backup being updated, updating the first backup using the updated second backup on the basis of the mapping relationship.

The update operation is similar to the recovery operation. Where a mapping relationship between data blocks in the first backup and the second backup is already learned, if the second backup is updated, then a to-be-updated part in the first backup may be looked up on the basis of the mapping relationship and further this part is updated. Specifically, with reference to the example in FIG. 6, suppose data block B23 in second backup 620 is updated and corresponds to data block A22 in first backup 610, data block B23 may be copied to cover data block A22. In this manner, various backups in the data storage system may be kept up-to-date.

In one embodiment of the presently disclosed inventive concepts, the data storage system is a Hadoop distributed file system. The Hadoop distributed file system is a popular data storage system at present; the system can save a plurality of backups of a data object in a plurality of data nodes, thereby providing a higher reliability. By applying the technical solution of the presently disclosed inventive concepts to the Hadoop distributed file system, backups generated after re-sorting data records in the data object on the basis of different queries may be saved in various data nodes. Therefore, the data query efficiency can be increased while ensuring the reliability.

With reference to the figures, description has been presented above as to how to manage a data storage system. Hereinafter, detailed description is presented to how to execute a query in the data storage system described in the presently disclosed inventive concepts. Specifically, in one embodiment of the presently disclosed inventive concepts, there is provided a method for querying a data storage system, comprising: receiving a query with respect to the data storage system; and in response to there existing, in an index of the data storage system, a query matching the query, accessing an address associated with the matching query in the data storage system so as to execute the query; wherein the data storage system is a data storage system managed by a method according to the presently disclosed inventive concepts.

Where backups generated on the basis of different queries are saved in the data storage system, whether a backup matching the received query may be searched for in the data storage system on the basis of an index. For example, the data storage system stores first backup 522 and second backup 532 as shown in FIG. 5, and the index records first query 520 and second query 530 associated with these two backups respectively. At this point, when a query similar to first query 520 is received, it may be executed in first backup 522, and when a query similar to second query 530 is received, it may be executed in second backup 532, so as to improve the query efficiency.

In one embodiment of the presently disclosed inventive concepts, there is further comprised: in response to there existing, in the index of the data storage system, no query matching the query, accessing an address, in the data storage system, associated with any query so as to execute the query. In other words, when the data storage system does not contain a query matching the received query, the received query may be executed in any backup in the storage system. Since various backups in the data storage system are set on the basis of functions of the data storage system and/or a frequency of a historical query, there is a quite low possibility that there is not any matching query in the index. Therefore, by means of the embodiments of the presently disclosed inventive concepts, the query efficiency can be improved significantly in most cases.

Figure 7:
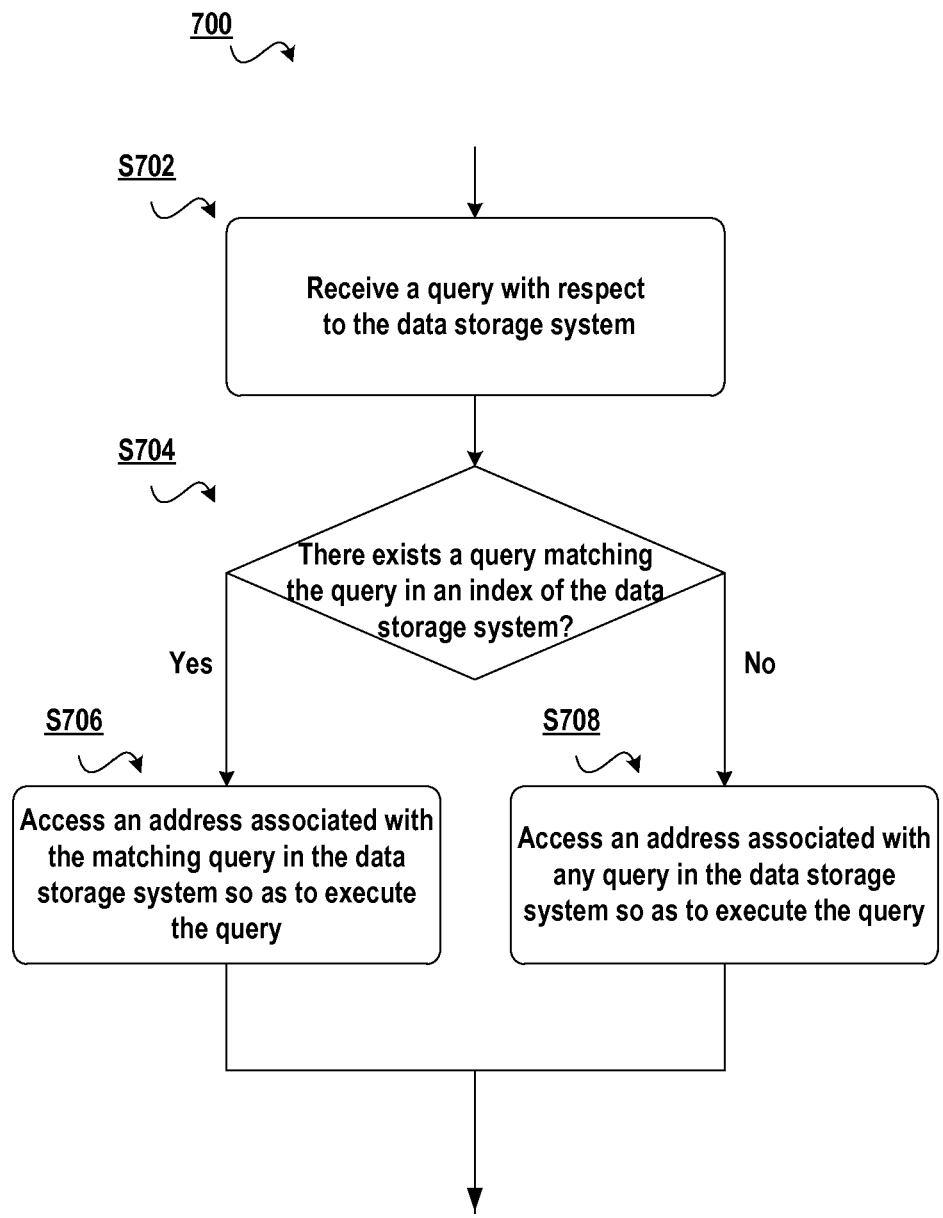
FIG. 7 schematically shows a flowchart of a method for querying a data storage system according to one embodiment of the presently disclosed inventive concepts.

FIG. 7 schematically shows a flowchart 700 of a method for querying a data storage system according to one embodiment of the presently disclosed inventive concepts. As shown in FIG. 7, in step S702, a query with respect to the data storage system is received. Subsequently in step S704, it is judged whether or not in the data storage system there exists a query matching the received query. If "yes," then the operational flow goes to step S706 where an address associated with the matching query in the data storage system is accessed so as to execute the query; otherwise, the operational flow goes to step S708 where an address associated with any query in the data storage system is accessed so as to execute the query.

It should be noted that although description is presented to details of the presently disclosed inventive concepts in the specification and figures with the data storage system maintaining one backup and two backups, those skilled in the art should understand more backups may be saved in the data storage system in order to improve the data reliability and/or further improve the query efficiency. Specifically, three backups may be maintained in the Hadoop distributed file system.

Various embodiments implementing the method of the presently disclosed inventive concepts have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the presently disclosed inventive concepts. The apparatus described in the presently disclosed inventive concepts comprises several means or modules, the means or modules configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 8A:
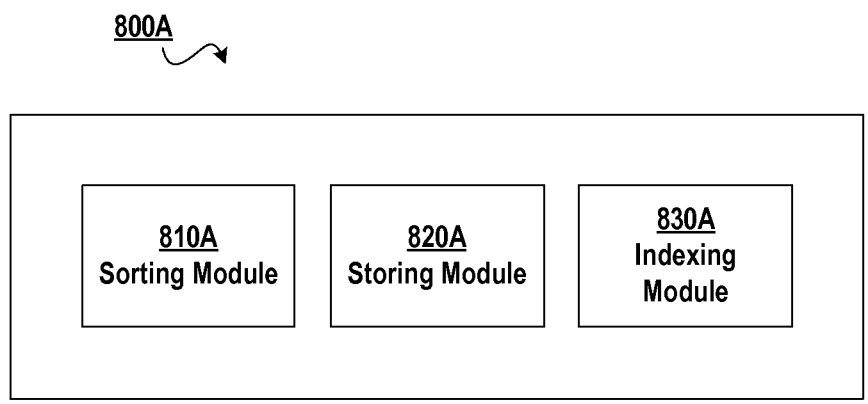
FIG. 8A schematically shows a block diagram of an apparatus for managing a data storage system according to one embodiment of the presently disclosed inventive concepts.

FIG. 8A schematically depicts a block diagram 800 of an apparatus for managing a data storage system according to one embodiment of the presently disclosed inventive concepts. As shown in FIG. 8A, there is provided an apparatus for managing a data storage system, comprising: a sorting module 810A configured to, in response to receiving a data object, sort data records in the data object on the basis of a first query so as to form a first backup; a storing module 820A configured to store the first backup in the data storage system; and an indexing module 830A configured to store, in an index of the data storage system, the first query and a first address of the first backup in the data storage system.

In one embodiment of the presently disclosed inventive concepts, sorting module 810A comprises: an obtaining module configured to obtain a first standard on the basis of the first query; and a first sorting module configured to sort data records in the data object according to the first standard so as to form the first backup.

In one embodiment of the presently disclosed inventive concepts, the first standard makes it possible that the query efficiency of executing the first query in the first backup is higher than the query efficiency of executing the first query in other file formed by sorting data records in the data object according to other standard.

In one embodiment of the presently disclosed inventive concepts, the data object is a multi-dimensional database, and the obtaining module comprises: a first obtaining module configured to obtain the first standard on the basis of at least one dimension in the multi-dimensional database corresponding to the first query.

In one embodiment of the presently disclosed inventive concepts, sorting module 810A comprises: a dividing module configured to divide the sorted data records into a plurality of data blocks according to block size supported by the data storage system; and a forming module configured to form the first backup on the basis of the plurality of data blocks.

In one embodiment of the presently disclosed inventive concepts, the sorting module 810A is further configured to sort the data records in the data object on the basis of a second query so as to form a second backup; the storing module 820A is further configured to store the second backup in the data storage system; and the indexing module 830A is further configured to store, in the index of the data storage system, the second query and a second address of the second backup in the data storage system.

In one embodiment of the presently disclosed inventive concepts, there are further comprised: a mapping module configured to obtain a mapping relationship between data blocks in the first backup and data blocks in the second backup; and a recovering module configured to, in response to the first backup being corrupted, recover the first backup from the second backup on the basis of the mapping relationship.

In one embodiment of the presently disclosed inventive concepts, the recovering module comprises: a lookup module configured to look up in the second backup a second backup block corresponding to a corrupted first backup block in the first backup on the basis of the mapping relationship; and a copying module configured to copy the second backup block to replace the corrupted first backup block.

In one embodiment of the presently disclosed inventive concepts, there are further comprised: a mapping module configured to obtain a mapping relationship between data blocks in the first backup and data blocks in the second backup; and an updating module configured to, in response to the second backup being updated, update the first backup using the updated second backup on the basis of the mapping relationship.

Figure 8B:
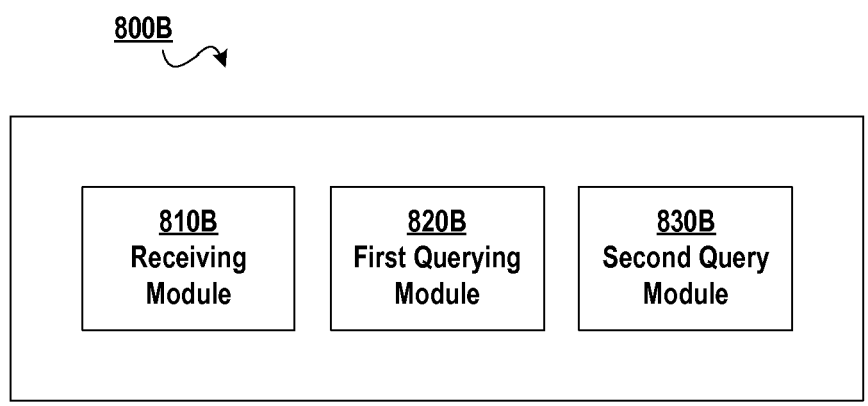
FIG. 8B schematically shows a block diagram of an apparatus for querying a data storage system according to one embodiment of the presently disclosed inventive concepts.

FIG. 8B schematically shows a block diagram 800B of an apparatus for querying a data storage system according to one embodiment of the presently disclosed inventive concepts. Specifically, there is provided an apparatus for querying a data storage system, comprising: a receiving module 810B configured to receive a query with respect to the data storage system; and a first querying module 820B configured to, in response to there existing in an index of the data storage system a query matching the query, access an address associated with the matching query in the data storage system so as to execute the query; wherein the data storage system is a data storage system managed by an apparatus according to the presently disclosed inventive concepts.

In one embodiment of the presently disclosed inventive concepts, there is further comprised: a second querying module 830B configured to, in response to there existing, in the index of the data storage system, no query matching the query, access an address, in the data storage system, associated with any query so as to execute the query.

The presently disclosed inventive concepts may be a system, a method, and/or a computer program product. The computer program product may include a computer readable storage medium (or media) having computer readable program instructions thereon for causing a processor to carry out aspects of the presently disclosed inventive concepts.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the presently disclosed inventive concepts may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presently disclosed inventive concepts.

Aspects of the presently disclosed inventive concepts are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the presently disclosed inventive concepts. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the presently disclosed inventive concepts have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing a data storage system, comprising:
   in response to receiving a data object, sorting data records in the data object on the basis of at least a first query so as to form a first backup of the data object;
   cause the first backup to be stored in a data storage system; and
   cause to be stored, in an index of the data storage system, the first query and a first address of the first backup in the data storage system;
   wherein the first query is a historical query;
   wherein sorting the data records on the basis of at least the first query comprises adjusting an order of the data records on the basis of one or more historical queries;
   wherein the sorting, in response to receiving the data object, data records in the data object on the basis of the first query so as to form the first backup comprises:
   dividing the sorted data records into a plurality of data blocks according to block size supported by the data storage system;
   forming the first backup on the basis of the plurality of data blocks;
   sorting the data records in the data object on the basis of a second query so as to form a second backup;
   storing the second backup in the data storage system;
   storing, in the index of the data storage system, the second query and a second address of the second backup in the data storage system;
   obtaining a mapping relationship between data blocks in the first backup and data blocks in the second backup;
   in response to the first backup being corrupted, recovering the first backup from the second backup on the basis of the mapping relationship;
   in response to the second backup being updated, updating the first backup using the updated second backup on the basis of the mapping relationship; and
   wherein the recovering, in response to the first backup being corrupted, the first backup from the second backup on the basis of the mapping relationship comprises:
   looking up in the second backup a second backup block corresponding to a corrupted first backup block in the first backup on the basis of the mapping relationship; and
   copying the second backup block to replace the corrupted first backup block.

2. The method according to claim 1, wherein the sorting, in response to receiving the data object, data records in the data object on the basis of at least the first query so as to form the first backup comprises:
   obtaining a first standard on the basis of the first query; and
   sorting data records in the data object according to the first standard so as to form the first backup;
   wherein the first standard comprises at least a meter ID; wherein the data object is a multi-dimensional database; and wherein the obtaining the first standard on the basis of the first query comprises: obtaining the first standard on the basis of at least one dimension in the multi-dimensional database corresponding to the first query.

3. The method according to claim 1, wherein sorting the data records causes previously nonconsecutive data records to be stored in consecutive data blocks; and
   wherein the data object comprises a mass database storing mass data.

4. The method according to claim 1, wherein the first query is characterized by a highest probability of generating a backup.

5. The method according to claim 1, wherein sorting the data records in the data object on the basis of at least the first query comprises:
   determining the first query based on a main function of the data storage system.

6. The method according to claim 1, wherein sorting the data records in the data object on the basis of at least the first query comprises:
   determining the first query based on an occurrence frequency of each query statement among a plurality of historical queries.

7. The method according to claim 1, comprising:
   forming a plurality of additional backups of the data object, wherein each of the additional backups is formed after sorting the data records in the data object according to a different one of a plurality of additional queries; and
   storing the plurality of additional backups in the data storage system; and
   in response to determining a subsequent query statement corresponds to a particular one of the plurality of additional queries, querying a corresponding one of the additional backups formed after sorting the data records in the data object according to the particular one of the plurality of additional queries.

8. A computer program product for querying a data storage system, the computer program product comprising a computer readable storage medium having program instructions embodied therewith, the program instructions readable by a processor to cause the processor to perform a method comprising:
   receiving, by the processor a query with respect to a data storage system;

sorting data records in a data object of the data storage system, wherein the sorting is performed on the basis of the first query, so as to form a first backup of the data object;

storing a first backup to be stored in the data storage system; and storing, in an index of the data storage system, the first query and a first address of the first backup in the data storage system;

wherein the query is characterized by a highest probability of generating a backup;

wherein the sorting the data records in the data object on the basis of the first query so as to form the first backup comprises:

dividing the sorted data records into a plurality of data blocks according to block size supported by the data storage system;

forming the first backup on the basis of the plurality of data blocks;

sorting the data records in the data object on the basis of a second query so as to form a second backup;

storing the second backup in the data storage system;

storing, in the index of the data storage system, the second query and a second address of the second backup in the data storage system;

obtaining a mapping relationship between data blocks in the first backup and data blocks in the second backup;

in response to the first backup being corrupted, recovering the first backup from the second backup on the basis of the mapping relationship;

in response to the second backup being updated, updating the first backup using the updated second backup on the basis of the mapping relationship; and wherein the recovering, in response to the first backup being corrupted, the first backup from the second backup on the basis of the mapping relationship comprises:

looking up in the second backup a second backup block corresponding to a corrupted first backup block in the first backup on the basis of the mapping relationship; and copying the second backup block to replace the corrupted first backup block.

9. The computer program product according to claim 8, comprising program instructions readable by a processor to cause the processor to:

in response to there existing, in an index of the data storage system, a query matching the query, access an address associated with the matching query in the data storage system so as to execute the query, the address being of a backup of sorted data records of a data object previously created using the matching query; and in response to there existing, in the index of the data storage system, no query matching the query, access an address, in the data storage system, associated with any backup in the data storage system, so as to execute the query.

10. An apparatus for managing a data storage system, comprising:

a sorting module configured to, in response to receiving a data object, sort data records in the data object on the basis of a first query so as to form a first backup of the data object, wherein the first query is characterized by a highest probability of generating a backup;

a storing module configured to store the first backup in the data storage system; and an indexing module configured to store, in an index of the data storage system, the first query and a first address of the first backup in the data storage system;

wherein the sorting module is further configured to: sort the data records in the data object on the basis of a second query so as to form a second backup;

wherein the storing module is further configured to store the second backup in the data storage system;

wherein the indexing module is further configured to store, in the index of the data storage system, the second query and a second address of the second backup in the data storage system; and the apparatus comprising:

a mapping module configured to obtain a mapping relationship between data blocks in the first backup and data blocks in the second backup; a recovering module configured to, in response to the first backup being corrupted, recover the first backup from the second backup on the basis of the mapping relationship, wherein the recovering module comprises:

a lookup module configured to look up in the second backup a second backup block corresponding to a corrupted first backup block in the first backup on the basis of the mapping relationship; and a copying module configured to copy the second backup block to replace the corrupted first backup block;

an updating module configured to, in response to the second backup being updated, update the first backup using the updated second backup on the basis of the mapping relationship; and wherein the sorting module comprises:

a dividing module configured to divide the sorted data records into a plurality of data blocks according to block size supported by the data storage system; and a forming module configured to form the first backup on the basis of the plurality of data blocks;

an obtaining module configured to obtain a first standard on the basis of the first query; and a first sorting module configured to sort data records in the data object according to the first standard so as to form the first backup.

11. The apparatus according to claim 10, wherein the sorting module further comprises:

wherein the first standard comprises a meter ID;

wherein the data object is a multi-dimensional database; and wherein the obtaining module comprises: a first obtaining module configured to obtain the first standard on the basis of at least one dimension in the multi-dimensional database corresponding to the first query.

12. An apparatus for querying a data storage system, comprising:

a receiving module configured to receive a query with respect to the data storage system; and a first querying module configured to, in response to there existing, in an index of the data storage system, a query matching the query, access an address associated with the matching query in the data storage system so as to execute the query; and wherein the data storage system is a data storage system managed by an apparatus according to claim 10.

13. The apparatus according to claim 12, comprising:

a second querying module configured to, in response to there existing, in the index of the data storage system, no query matching the query, access an address, in the data storage system, associated with any backup in the data storage system, so as to execute the query.

* * * * *